Jan. 10, 1956  J. A. BUVELOT  2,730,206
AXLE BRAKE FLANGE
Filed April 10, 1953

INVENTOR.
John A. Buvelot
BY
Orrin O. P. Garner
Atty.

United States Patent Office 2,730,206
Patented Jan. 10, 1956

2,730,206

AXLE BRAKE FLANGE

John A. Buvelot, Chicago, Ill., assignor to American Steel Foundries, Chicago, Ill., a corporation of New Jersey Application April 10, 1953, Serial No. 348,043

6 Claims. (Cl. 188—206)

My invention relates to axle assemblies of the trailing wheel type and more particularly to a novel brake flange operatively associated therewith.

It is a general object of my invention to provide a novel movable brake flange for use with a trailing wheel type axle assembly, said flange being operative to transfer torque induced by brake application to a related vehicle body which is supported by said assembly.

A specific object of my invention is to provide a fabricated brake flange as distinguished from the forged flanges heretofore in use, said fabricated flange being stronger and more durable hence more resistant to failure than an equivalent dimensioned forged flange.

It is a further object of my invention to provide a fabricated flange of such construction and design so as to eliminate finish machining operations heretofore necessary on flanges employed, said flanges being considerably more economical to manufacture than the flanges heretofore utilized by the art.

Other objects of my invention will become apparent in the course of the following description and the drawing, wherein.

Figure 1:
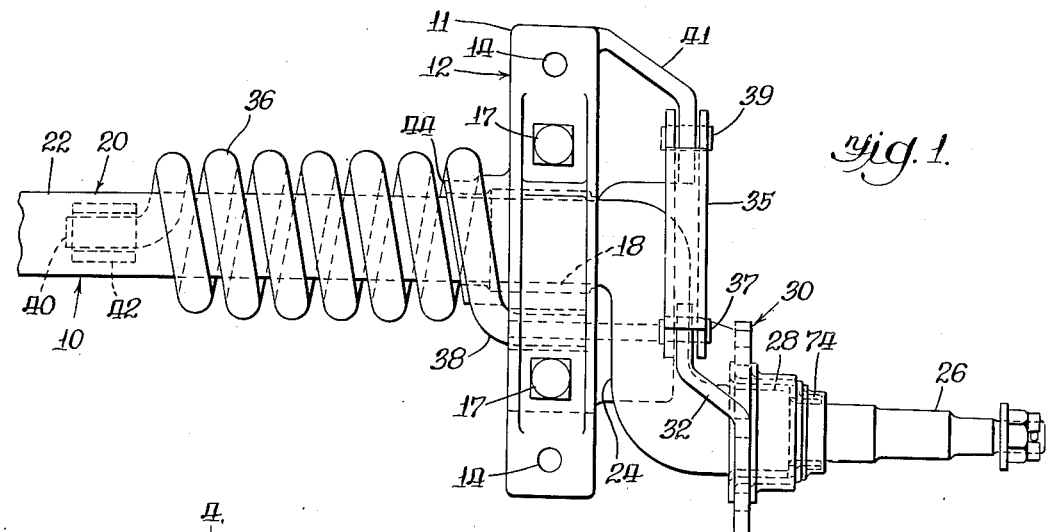
Figure 1 is a plan view of an axle assembly embodying my invention, only one half of the assembly being shown, inasmuch as it is duplicated in the other portion.

To achieve clarity, certain details have been omitted from various views where it is believed said details are not important to an adequate showing of the invention.

Unless otherwise noted, reference herein is made to one half of the assembly, it being understood that the structure mentioned is duplicated on the other side of the assembly.

Describing the invention in detail, an axle assembly generally designated 10, is utilized to support a related vehicle body by being disposed transversely of the body and secured to the underside thereof. Attachment of the assembly to the body is preferably accomplished by means of a bearing block, generally designated 12, which may be integral with or secured to the underside of the vehicle body and adjacent each side thereof by means of stud and nut connection utilizing the holes 14 of the bearing block 12. The bearing block 12 may be, as herein illustrated, of the demountable cap type having a cap 16 conventionally bolted at 17 to the base 11 of the block 12. The base 11 and the cap 16 define a transverse hole 18, which, with suitable bearings (not shown) provides journal connection for an axle, generally designated 20.

The axle 20 comprises a main shaft 22, which is pivotally associated with the bearing block 12 by being extended through the hole 18 and rotatable therein. Outboardly of the block 12 a throw or crank arm 24 is formed to extend transversely of the shaft 22 and may be integral therewith or demountably keyed thereto.

Another shaft or spindle 26 is formed directionally paralleling the main shaft 22 and eccentrically carried thereby by means of rigid connection with the crank arm 24 at a point spaced transversely from the main shaft 22. It is to be noted that the spindle 26 may be formed integral with the crank arm 24 or may be demountably keyed thereto. The spindle 26 is formed to rotatably mount by conventional cup, cone, and bearings, an associated wheel (not shown).

Adjacent the inboard end of the spindle 26 a bearing surface 28 is provided. A brake flange or stator 30 is sleeved over the surface 28 for rotational engagement thereon. The flange 30 presents an upwardly directed inwardly offset arm 32 which is pivotally connected as at 37 to one end of a torque link 35, said link 35 having its opposite end pivotally connected as at 39 to a lug 41 integrally formed with the bearing block 12.

In the structure above described the spindle 26, which is also the pivotal axis of the associated wheel, can be said to trail the center shaft 22 and rotate about the longitudinal axis of said center shaft. Herein lies the reason for the designation "trail type" axle assembly referred to above. It is to be noted that relative vertical movement between the related supporting wheel and the supported vehicle body is contemplated. To cushion this relative vertical movement the preferred form of the invention utilizes a helical spring 36 disposed to surround the axle 22 and to have one end 38 fixedly secured to the bearing block 12, as by reception in a complementary hole thereof. The other end 40 of the helical spring 36 is fixedly secured to the axle 20 by means of a clip 42 which is welded to the main shaft 22, as shown in Figure 1. To insure proper cushioning action of the spring, a shoulder 44 is provided integral with the bearing block 12 and on its inboard side, to partially support the inside surface of the adjacent spring convolution. It is to be noted that the preferred method of cushioning the relative movement of the supported vehicle body is not per se part of the invention and that other resilient devices could reasonably be utilized in combination with a "trail type" axle assembly.

The cushioning or resilient support offered to the carried vehicle body is due to the bending stress induced into and flexibly resisted by the spring 36 as the spindle 26 and the associated wheel move vertically relative to the vehicle body and consequently rotate the main shaft 22 of the axle 20.

In the art as practiced today, a braking mechanism to decelerate the related vehicle such as any conventional brake shoe (not shown), is attached to the brake stator 30 to operatively engage a braking surface such as a conventional drum (not shown) carried by the associated wheel (not shown). Also in the practiced art, the brake stator 30 is rigidly, that is nonrotatably, fixed to the spindle 26. Hence, in conventional axle assemblies of the type described, the torque forces set up around the spindle 26 during brake application tend to urge the spindle to rotate about the axis of the shaft 22, thus causing unnecessary movement of the spindle 26 and unnecessary oscillation of the supported vehicle.

Figure 3:
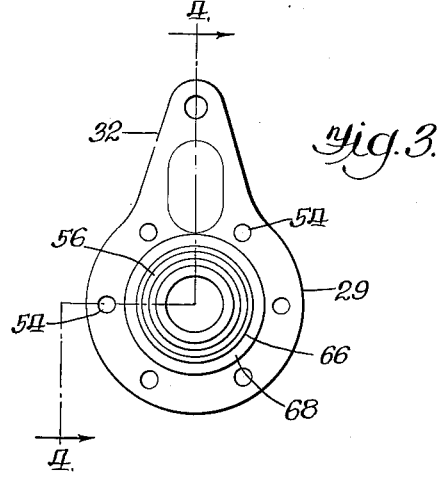
Figure 3 is a plan view of the novel brake flange incorporated in the assembly.
Figure 4:
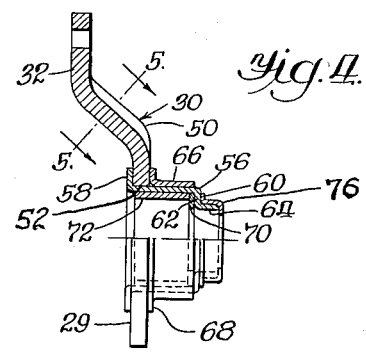
Figure 4 is a partial sectional view taken along line 4—4 of Figure 3.
Figure 2:
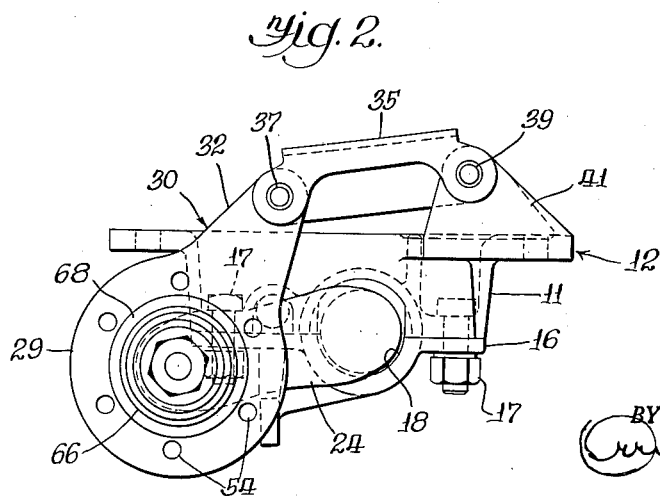
Figure 2 is a side elevational view of the assembly.
Figure 5:
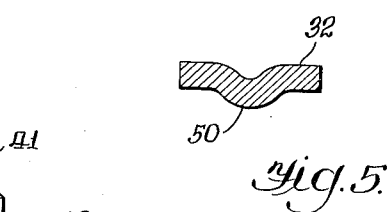
Figure 5 is a sectional view taken at 5—5 of Figure 4.

Directing attention to Figures 3 and 4, wherein is illustrated the detailed construction of my novel flange 30, it will be seen that said flange is formed entirely of fabricated press metal parts and is operatively complete as assembled without the necessity of further and expensive machining operations.

The flange 30 consists of a base plate 29 having the offset arm 32 integrally formed therewith, said arm being corrugated as at 50 in the area of offset to add strength thereto. A hole 52 is located centrally of the plate 29, said hole 52 being peripherally surrounded by a plurality of mounting holes 54 offering attachment means for the conventional braking mechanism (not shown).

Positioned within the hole 52 and extending therethrough outboardly of the base plate 29 is an inner housing 56, said inner housing being of general cylindrical form and having a peripheral abutment 58 extending outwardly from the inner end of the cylindrical outer surface of the housing. The abutment 58 engages the inboard surface of the base plate 29 and is secured thereto preferably by a plurality of spot welds at equal angular spacings about the hole 52, for example, six spot welds at 60 degrees. At the outer end, said inner housing is necked down as at 69 to form a circular shoulder 62, said housing being formed to again extend axially from the radially inner limit of the shoulder 62 to the point of termination of the housing whereat a circular opening 64 is presented so that the inner housing may be sleeved over the spindle 26.

To add strength to the fabricated structure an outer housing 66, though not absolutely necessary, may be sleeved over the main cylindrical portion of the inner housing outboardly of base plate 29. It will be seen that the outer housing is of general cylindrical form and presents a cylindrical abutment 68 extending radially outwardly of the inner end of the cylindrical outer surface of the base plate 29 and is secured thereto preferably by a plurality of spot welds at equal angular spacings about the hole 52, for example, six spot welds at 60 degrees.

The outer housing 66 is preferably rigidly connected to the inner housing 56, said rigid connection being provided by a plurality of spot welds spaced peripherally about the cylindrical forms of said housings, for example, four spot welds at 90 degrees.

A thrust washer 70 is positioned within the inner housing 56 to abut the circular shoulder 62 formed therein. The thrust washer may be of any suitable bearing material, however, a nonmetallic type washer is employed in the preferred embodiment.

A cylindrical bearing 72 is positioned within the inner housing 56 in such a manner as to tightly abut at one end the thrust washer 70 and to form a cylindrical bearing surface extending substantially the full length of the inner housing main cylindrical portion. It should be noted that the bearing 72 is fixedly secured to the inner housing 56 to prevent rotation therein and to act as a retainer for the washer 70. In the preferred embodiment I have arranged the inside diameter of the housing 56 and the outside diameter of the bearing 72 to engage each other in a tight press fit thus accomplishing the connection therebetween.

Referring again to Figure 1, it will be seen that a grease seal 74 is provided to surround the spindle 26, said seal being positioned intermediate the thrust washer 70 and the outboard end of the inner housing 56. To retain the grease seal in position, a cap or seat 76 of cylindrical form fits over the outer extremity of the inner housing 56, said cap presenting a radially inwardly directed ledge to fit closely about the spindle 26 and engage the outer end of the seal 74 and retain same. The seat 76 is secured to the inner housing, again preferably by a plurality of spot welds, for example, two spot welds at 180 degrees.

Thus it will be seen that the brake flange, I have fabricated, is of such construction as to eliminate entirely the necessity of final machining, said flange being durable and more resistant to operational failure than the flanges heretofore employed in the art.

I claim:

1. A fabricated brake flange for use in a trailing wheel axle assembly comprising a relatively flat base plate, an arm formed integral with the base plate and having a portion offset angularly from the plane of said plate, a bearing receiving inner housing disposed to extend through a hole centrally located in the plate and above said plate on the side thereof remote from said offset, said housing being of generally cylindrical form and having a radially extending abutment engaging and secured to the face of said plate adjacent said offset, means on the housing to position bearings relative thereto, and a cap connected to the housing in such a manner as to retain a grease seal within the housing when said flange is assembled to said axle assembly.

2. A fabricated brake flange according to claim 1, and including an outer housing of generally cylindrical form sleeved over said inner housing, another radially extending abutment on the outer housing engaging and secured to the outboard face of said plate, and a rigid connection between the inner and outer housings.

3. A fabricated brake flange according to claim 2, wherein the inner and outer housings are secured to the base plate and connected to each other by spot welding.

4. In a brake flange for use in a trailing wheel type axle assembly, a flat base plate, an arm integrally formed with said plate, said arm including a portion in acute angle relation to the plane of said plate, and a segment remote from said plate in parallel relation thereto, said portion being of nonplanar form as seen in cross section, an inner housing of substantially cylindrical form extending through a hole in the base plate and outboardly of the plate, means to secure the housing to the inner face of said plate, a shoulder formed on the inside diameter of said housing, said shoulder being spaced from and lying in a plane parallel to the plate, an outer housing of cylindrical form sleeved over the inner housing between the plate and the shoulder, said outer housing including an abutment engaging and connected to the outer surface of said plate, grease seal retaining means secured to said inner housing on the extremity remote from said plate, and bearing means disposed within said inner housing.

5. A brake flange for use in a trailing wheel type axle assembly as described in claim 4, wherein said bearing means include a nonmetallic thrust washer engaging said shoulder, and a nonmetallic bushing of generally cylindrical form press fitted within said inner housing and engaging and retaining said thrust washer.

6. A brake flange for use in a trailing wheel type axle assembly as described in claim 4, wherein both of said housings are connected to the plate by spot welding and said housings are connected to each other by spot welding.

References Cited in the file of this patent

UNITED STATES PATENTS 1,932,219    Kendall _____ Oct. 24, 1933